3,440,276
PROCESS FOR PREPARING ACRYLIC ESTERS
Calvin N. Wolf, Princeton, and Joseph F. McMahon, Clinton, N.J., assignors to Commercial Solvents Corporation, New York, N.Y., a corporation of Maryland
No Drawing. Filed Dec. 29, 1965, Ser. No. 517,437
Int. Cl. C07c 67/00
U.S. Cl. 260—486                     5 Claims

ABSTRACT OF THE DISCLOSURE

A process for preparing acrylic esters by contacting a gaseous mixture of formaldehyde and an alkyl ester of the formula R—CH$_2$—COOR$^1$ wherein R is hydrogen or lower alkyl and R$^1$ is lower alkyl, for example, methyl acetate, with niobium oxide at a tempearture in the range of from about 200 to 500° C.

---

This invention generally relates to a process for the production of acrylic esters by the vapor phase reaction of formaldehyde and an alkyl ester. In a particular aspect this invention relates to the production of acrylic esters by the vapor-phase reaction of formaldehyde, and an aliphatic ester in the presence of a niobium oxide catalyst. In a further aspect this invention relates to the production of acrylic esters by the vapor-phase reaction of formaldehyde and an alkyl ester in the presence of a niobium oxide catalyst supported on alumina.

Acrylic esters, especially methyl acrylate, methyl methacrylate and ethyl acrylate, are used extensively in the manufacture of a wied group of polymeric materials. Such esters have been produced by the catalytic vapor-phase reaction of an alkyl ester and formaldehyde. Materials which have been found to catalyze this reaction include the zeolites, for example magnesium alumino silicate and sodium alumino silicate, zinc chromate, rubidium hydroxide, the alkali metal oxides and the alkaline earth metal oxides. This process possesses many inherent advantages, the principal of which is that it is a one step condensation reaction. However, the process is not entirely satisfactory in all respects. Heretofore, it has been necessary to use large excesses of alkyl ester which must either be discarded or recovered and recycled to the process. In operation of the process, even with the most effective of the above named catalysts, a minimum mole ratio of alkyl ester to formaldehyde of 2.5:1 has been required. For optimum results it has typically been required to use mole ratios of alkyl ester to formaldehyde in excess of 10:1.

It is an object of this invention to provide a process for the production of acrylic esters.

It is another object of this invention to provide a process for the production of acrylic esters by the vapor-phase reaction of approximately equimolar quantities of formaldehyde and an alkyl ester in the presence of catalytic amounts of niobium oxide.

It is a further object of this invention to provide a process for the produtcion of acrylic esters by the vapor-phase reaction of approximately equimolar quantities of formaldehyde and an alkyl estre in the presence of catalytic amounts of niobium oxide supported on alumina.

Still further objects and advantages of the present invention will be apparent from the specification and appended claims.

A first embodiment of invention is directed to a process for the production of acrylic esters by contacting a gaseous mixture of formaldehyde and an alkyl ester with catalytic amounts of niobium oxide at tempeartures at which acrylic esters are formed. This reaction may be represented by the following formula:

$$R—CH_2—COOR^1 + HCHO \longrightarrow R\underset{\underset{CH_2}{|}}{C}—COOR^1 + H_2O$$

in which R represents hydrogen or an alkyl radical and in which R$_1$ represents an alkyl radical.

A second and preferred embodiment of this invention is directed to a process for the production of acrylic esters by contacting a gaseous mixture of formaldehyde and an alkyl ester with catalytic amounts of niobium oxide supported on alumina.

The alkyl esters employed in the process of this invention are converted by reaction with formaldehyde to acrylic esters. Suitable alkyl esters for use in the process are represented by the formula

R—CH$_2$—COOR$^1$ wherein R represents hydrogen or a lower alkyl radical and R$^1$ represents a lower alkyl radical. For the purpose of this invention, the term "lower alkyl radical" is taken to mean an alkyl radical containing a sufficiently low number of carbon atoms, such that the alkyl ester of which it is a substituent will be readily vaporizable without substantial decomposition. Representative alkyl esters suitable for use in this invention include methyl acetate, ethyl acetate, methyl propionate, ethyl propionate, propyl acetate, methyl butyrate and their near higher homologs having the above structure.

The formaldehyde used in the invention can be of any suitable form. For example, it can be anhydrous paraformaldehyde or it can be in the form of a solution such as aqueous formaldehyde or methanolic formaldehyde.

Since the reaction of formaldehyde and alkyl ester is carried out in the vapor-phase, the temperature employed must be sufficient to maintain the reactants in the vapor-phase but should not exceed temperatures at which substantial decomposition of the particular reactants and reaction products occur. In general the temperature that is used will be in the range of from about 200° C. to about 500° C. The preferred temperature naturally will principally depend on the alkyl ester utilized. As for example, when methyl acetate is utilized in the process the reaction suitably is conducted at a temperature in the range of from about 250 to about 450° C.

It is an advantage of the present invention that it may be conveniently practiced at atmospheric pressure. However, if it is desired, sub-atmospheric pressures or super-atmospheric pressures may be utilized. Generally suitable pressures are in the range of from about 10 to about 1000 lbs. per square inch.

While a principal advantage of this invention is that quantative amounts of formaldehyde and alkyl ester in the gaseous reaction mixture are successfully employed, the mole ratios of formaldehyde to alkyl ester may be varied over a considerable range. Suitably this range extends from about 0.1 mole of formaldehyde for each mole of alkyl ester to about 10 moles of formaldehyde for each mole of alkyl ester. For optimum results it is generally preferable to utilize from about 0.5 mole of formaldehyde for each mole of alkyl ester to about 5 moles of formaldehyde for each mole of alkyl ester.

The present invention is characterized by the catalytic action of niobium oxide. The niobium oxide catalyst is usually employed with a suitable catalyst support. Such supports include silicon carbide, silica gel and alumina. When alumina is used as the support, it appears to contribute in promoting the reaction. In this respect alumina has been found to be more advantageous than other supports and is therefore preferred as the supporting material for niobium oxide in the present invention.

When the catalyst comprises niobium oxide supported on alumina the respective materials may be present in any suitable proportions. It has been found that a particularly suitable catalyst because of the efficiency of the process conducted therewith comprises about 10 parts by weight of niobium oxide and correspondingly about 90 parts by weight of alumina.

The niobium oxide catalyst may be prepared by any available procedure known to the art. As one example, the catalyst may be prepared by impregnating the support with an aqueous solution of a water-soluble source of niobium oxide, such as niobium oxalate, filtering the impregnated material to remove water and then calcining the filtered material in an oxygen-containing atmosphere such as air at elevated temperatures on the order of 500–1000° C. When the desired support for the niobium oxide is alumina, the catalyst material may be prepared by co-precipitation of the two materials. In this preparation a precipitating agent, for example ammonium hydroxide, is added to an aqueous solution containing water-soluble sources of niobium oxide and alumina. The thus precipitated material is filtered to remove water and then calcined at elevated temperatures to obtain the catalyst. Aluminum nitrate is an example of a suitable water-soluble source of alumina.

The niobium oxide may be used as the sole catalyst in the present invention or if desired small amounts of promoters other than or in addition to alumina may be utilized with the niobium oxide to assist in obtaining the acrylic esters. Representative promoters include the alkali metal oxides, for example lithium oxide and potassium oxide, and the alkaline earth metal oxides, for example calcium oxide and magnesium oxide.

The catalyst including the supporting material if one is used may be of any suitable size or shape. The catalyst may be used in the form of compacted pellets or other shaped pieces of suitable size or it may be used in the form of fragments or other particles of regular or irregular contour. The catalyst may also be used in "fluidized" form such as a fine powder or dust.

During the course of the reaction, the catalyst may show some loss of activity. However, the activity of the catalyst may be readily restored by heating it in an oxygen-containing atmosphere at elevated temperatures on the order of 500–1000° C.

The process of the present invention is most conveniently carried out in a continuous manner although batchwise operation may also be used. For continuous operation the feed components are brought into the vapor state in a suitable vaporizer and the reaction is effected by passing the gaseous mixture of the feed components through a reaction zone containing the catalyst. The reaction zone advantageously is defined by an elongated tube or tubes wherein the catalyst is positioned. A separate vaporizing means may be employed or the forepart of the heated reaction zone may serve as the vaporizer for the feed components.

The flow rate of the gaseous mixture of formaldehyde and alkyl ester through the catalyst bed can be varied over a wide range. Typically the flow rate is within the range of about 0.2 to about 5.0 grams of gaseous feed per hour per cubic centimeter of catalyst material.

The acrylic esters produced by the process of the present invention may be recovered by any suitable procedure. One such procedure involves liquefying the reaction product by cooling and then subjecting the liquefied product to fractional distillation to recover a purer acrylic ester product.

The invention will be understood more fully by reference to the following examples. It is understood that the examples are presented for purposes of illustration only and are not intended as a limitation of the invention.

In the following examples the reactions were carried out by passing gaseous mixtures of alkyl ester and formaldehyde downward through an electrically heated tube the lower portion of which contained the catalyst material. Vapors issuing from the reaction tube were passed through an ice-cooled condensing system and the condensed products were collected for analysis. Before each run the system was flushed with nitrogen and the unit was brought to the desired temperature.

Example 1

A gaseous mixture of methyl acetate and aqueous formaldehyde in a mole ratio of formaldehyde to ester of 3.4:1 was passed through a reactor tube containing as catalyst niobium oxide impregnated on alumina at a temperature of approximately 250° C. at atmospheric pressure and at a flow rate of 1.4. The catalyst contained approximately 10% by weight of niobium oxide. The condensed effluent from the reactor was found to contain methyl acrylate in a yield of 15% based on the methyl acetate.

Example 2

A gaseous mixture of formaldehyde, methanol and methyl acetate in a mole ratio of formaldehyde to ester of 0.9 to 1.0 and a mole ratio of methanol to methyl acetate of 0.7 to 1.0 was passed through a reactor tube containing as catalyst niobium oxide impregnated on alumina at a temperature of approximately 300° C. at atmospheric pressure and at a flow rate of 1.2. The catalyst contained approximately 10% by weight of niobium oxide. The condensed effluent was found to contain methyl acrylate in a yield of 13% based on the methyl acetate.

Example 3

A gaseous mixture of formaldehyde, methanol and methyl acetate in a mole ratio of formaldehyde to methyl acetate and a mole ratio of methanol to methyl acetate of 2.1 to 1.0 and 1.1 to 1.0 respectively was passed through a reactor tube containing as catalyst niobium oxide on alumina at a temperature of approximately 325° C. at atmospheric pressure and at a flow rate of 1.2. The catalyst was prepared by the co-precipitation of niobium oxide and alumina. The catalyst contained approximately 10% by weight of niobium oxide. The condensed effluent was found to contain methyl acrylate in a yield of 14% based on the methyl acetate.

Example 4

A gaseous mixture of formaldehyde, methanol and methyl propionate in a mole ratio of formaldehyde to methyl propionate and methanol to methyl propionate of 3.5 to 1.0 and 2.0 to 1.0 respectively was passed through a reactor tube containing as catalyst niobium oxide impregnated on alumina at a temperature of 300° C. at atmospheric pressure and at a flow rate of 1.4. The catalyst contained approximately 10% by weight of niobium oxide. The condensed effluent was found to contain methyl methacrylate in a yield of 12% based on the methyl propionate.

Examples 5–8

Additional examples of the preparation of acrylic esters are given in the table. The acrylic esters are prepared following the general procedure utilized in Example 1.

TABLE

| Example No. | Alkyl ester | Catalyst | Product |
| --- | --- | --- | --- |
| 5 | Methyl butyrate | Niobium oxide on silicon carbide. | Methyl alpha-ethyl-acrylate. |
| 6 | Ethyl acetate | Niobium oxide on silica gel. | Ethyl acrylate. |
| 7 | Propyl acetate | Niobium oxide on alumina. | Propyl acrylate. |
| 8 | Methyl caproate | do | Methyl alpha-butyl-acrylate. |

Since many embodiments of this invention may be made and since many changes may be made in the em-

We claim:
1. A process for the preparation of acrylic esters which comprise contacting a gaseous mixture comprising formaldehyde and an alkyl ester of the formula

$$R-CH_2-COOR$$

wherein R is hydrogen or lower alkyl and $R^1$ is lower alkyl, the said mixture having a mole ratio of formaldehyde to alkyl ester of in the range of about 0.1:1 to about 10:1 with a niobium oxide catalyst at a temperature in the range of from about 200 to about 500° C.

2. The process of claim 1 wherein the niobium oxide catalyst is supported on alumina.

3. The process of claim 1 wherein the reaction is conducted at a pressure in the range of about 10 to about 1000 lbs. per square inch.

4. The process of claim 1 wherein the alkyl ester is methyl acetate.

5. The process of claim 4 wherein the temperature is in the range of from about 250 to about 450° C.

References Cited

UNITED STATES PATENTS

| | | | |
|---|---|---|---|
| 2,821,543 | 1/1958 | Etherington | 260—486 |
| 3,014,958 | 12/1961 | Koch et al. | 260—486 |
| 3,022,338 | 2/1962 | Enk et al. | 260—486 |
| 3,089,900 | 5/1963 | Vitcha et al. | 260—486 |

LORRAINE A. WEINBERGER, *Primary Examiner.*

A. P. HALLUIN, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,440,276                          April 22, 1969

Calvin N. Wolf et al.

It is certified that error appears in the above identified patent and that said Letters Patent are hereby corrected as shown below:

Column 1, line 33, "wied" should read -- wide --; line 51, "in excess of" should read -- of in excess of --; line 61, "produtcion" should read -- production --; line 63, "estre" should read -- ester --. Column 5, line 7, the formula should read $$R\text{-}CH_2\text{-}COOR^1$$

Signed and sealed this 10th day of March 1970.

(SEAL)
Attest:

Edward M. Fletcher, Jr.                        WILLIAM E. SCHUYLER, JR
Attesting Officer                                    Commissioner of Patents